Patented Dec. 8, 1931

1,834,974

UNITED STATES PATENT OFFICE

JAMES W. SCHADE, OF AKRON, AND HARLAN L. TRUMBULL, OF HUDSON, OHIO, ASSIGNORS TO THE B. F. GOODRICH COMPANY, OF NEW YORK, N. Y., A CORPORATION OF NEW YORK

RUBBER ARTICLE AND METHOD OF MAKING SAME

No Drawing.  Application filed August 24, 1928.  Serial No. 301,944.

This invention relates to the production of articles directly from aqueous dispersions and particularly to an improved method of making such articles and to the articles so produced.

Articles of rubber are commonly made from crude rubber which is first plasticized by mechanical treatment, that is, subjected to a crushing and kneading action, known as mastication; then, there is admixed with the plastic broken-down rubber, fillers, pigments, vulcanizing agents and other compounding ingredients. These mixtures are then subjected to such further working and shaping as the nature of the article to be made may require.

It has also been proposed to form articles directly from latex, either in its natural state or concentrated or admixed with thickening and/or compounding ingredients, as by dipping, spraying, spreading, molding, extruding, electrolytic deposition and the like. This method produces a structure in which the rubber globules of the natural latex are not ruptured and their identity destroyed, as in mastication, and the resulting rubber structure possesses a texture which differs from that of rubber which has been subjected to mastication. For example, masticated rubber before its vulcanization possesses a much greater tack or stickiness than does rubber obtained directly from latex, while the latter, when vulcanized, is far superior in tensile strength, durability and other important characteristics.

It is the purpose of this invention to utilize these differing properties of masticated rubber and of rubber produced from latex without mastication to produce rubber products having combined therein the desirable properties both of latex rubber and of masticated rubber, and thus to make rubber products materially differing from, and superior for many purposes to, any rubber products heretofore available in the industry.

The present invention consists in modifying the properties of products made as hereinabove described by utilizing an admixture of a natural latex with its unruptured rubber globules and with an artificial aqueous dispersion of a plasticized crude or vulcanized rubber. The dispersions may be in a vulcanized or unvulcanized condition, concentrated or compounded with other ingredients in any way desired, and subjected to such purifying or cleaning action as may be necessary or desirable.

In one embodiment of our invention, rubber latex is mixed with an artificial aqueous dispersion prepared from a plasticized or masticated crude or vulcanized rubber, to produce a dispersion containing intimately and uniformly admixed original rubber globules and finely divided masticated rubber particles. This mixed dispersion may, either with or without further treatment, be employed in the production of rubber articles directly therefrom, which articles will be composed of the homogeneously arranged unruptured rubber globules and finely divided plasticized rubber particles. By suitably regulating the proportions of the latex and the aqueous dispersion of masticated rubber, the properties of the rubber articles produced directly from a mixed latex and rubber dispersion can be varied to a considerable extent.

The aqueous dispersions of plasticized rubber we prefer to employ are produced by dispersing plasticized rubber in an aqueous medium in the presence of a hydrophilic colloid, such as glue, gelatin, casein, gum arabic and the like, by mastication, with the gradual addition of water until a plastic mass is formed in which the rubber is the dispersed phase and the hydrophilic colloid is the continuous phase. This plastic mass is then diluted with water to such a degree as to produce when mixed with latex a liquid body of desired consistency.

The mixed dispersions have been found to be particularly advantageous in the direct production of formed articles therefrom by electro-deposition upon an anodic body. This is shown in the three following experiments involving products made from (A) natural latex, (B) a mixture in equal parts of rubber latex and an aqueous dispersion of masticated or plasticized crude rubber, and (C) a mixture in equal parts of rubber latex and an aqueous dispersion of a plasticized vulcanized rubber. In each case, the latex or latex mixture was treated by adding thereto in the form of an aqueous dispersion zinc stearate 1.5 per cent., sulfur 3 per cent., organic accelerator 0.3 per cent. and antioxidant 0.75 per cent. based on the weight of the solid content of the latex or latex mixture.

Each of the compositions, A, B, and C, was placed in an electrophoretic apparatus and a layer of a rubber composition deposited therefrom by an electric current of suitable density (about 0.6 amperes per sq. cm.) upon a metallic anode to a thickness of about one-sixteenth of an inch. The deposited rubber composition was in each case stripped from the anode, dried and vulcanized by subjecting it to heat, as in an oven maintained at 275° F. The results of tests of these products are shown in the following table:

*Stress strain in pounds per sq. in. at varying elongations*

| Elongation | A | B | C |
|---|---|---|---|
| 100% | 76 | 70 | 119 |
| 200 | 121 | 105 | 193 |
| 300 | 197 | 193 | 341 |
| 400 | 288 | 281 | 489 |
| 500 | 575 | 492 | 771 |
| 600 | 985 | 1107 | 1363 |
| 700 | 1939 | 2265 | 2163 |
| 800 | 3212 | 3121 | 3200 |
| Elongation at break | 890% | 775% | 815% |
| Resistance to tear at optimum cure | 14 | 18 | 25 |

The resulting product was in each of the cases B and C smooth and dense and exhibits a tensile strength comparable with latex rubber, while the sheets are of a "nervier" structure than is obtainable with mill-mix rubber. The products B and C also exhibit properties superior to those of product A, in that (1) in the uncured state the sheet is much tackier and adheres better to itself, as in splicing, or to other objects; (2) the vulcanized sheet has a higher chafing resistance; and (3) the maximum tear resistance and the maximum tensile occur at the same degree of vulcanization (optimum cure), while in latex rubber the tear resistance falls off as the optimum cure is approached. In fact, the properties of the above described products B and C are superior in many respects to latex rubber A and to mill-mix sheets made according to the common practice in rubber factories.

It is to be understood that this invention contemplates the production of rubber articles direct from latex and dispersed plasticized rubber mixtures by dipping, spraying, spreading, molding, and other well-known processes.

The term "rubber" herein employed is intended to include caoutchouc, balata, gutta percha and other caoutchouc-like substances, whether vulcanized or unvulcanized, and whether or not admixed with other ingredients. The term "latex" is defined for the purpose of this application as the natural milky-juice of laticiferous or rubber plants, whether or not concentrated or diluted and/or admixed with other ingredients, such as preservatives, stabilizers, protective colloids, vulcanizing agents and the like.

It is obvious that numerous modifications and variations in the processes hereinabove described may be made without departing from the principles of this invention. It is our intention not to limit the claims hereof except as may be necessitated by the prior art.

We claim:

1. The herein described method which comprises forming a homogeneous mixture of latex and an aqueous dispersion of a plasticized rubber, producing a formed article from said mixture, and drying and vulcanizing the said article.

2. The herein described method which comprises preparing an aqueous dispersion of a plasticized coagulated rubber, forming a homogeneous mixture of latex and said aqueous rubber dispersion, producing a formed article from said mixture, and drying and vulcanizing said article.

3. The herein described process which comprises plasticizing a coagulated rubber, dispersing said rubber in fine particle size in an aqueous medium, forming a homogeneous mixture of latex and said aqueously dispersed rubber, producing a formed article from said mixture, and drying and vulcanizing the article.

4. The herein described process which comprises plasticizing a coagulated unvulcanized rubber, dispersing said rubber in fine particle size in an aqueous medium, forming a homogeneous mixture of latex and said aqueously dispersed rubber, depositing on a form from said mixture an article in its general final confirmation, and drying and vulcanizing the article.

5. As a new article of manufacture, a vulcanized rubber article comprising a homogeneous admixture of unruptured latex globules and finely dispersed particles of a coagulated rubber.

6. As a new article of manufacture, a vulcanized rubber article comprising a homogeneous admixture of unruptured latex globules and finely dispersed particles of masticated rubber.

In witness whereof we have hereunto set our hands this 24th day of July, 1928.

JAMES W. SCHADE
HARLAN L. TRUMBULL.